(12) United States Patent
Hoffmann et al.

(10) Patent No.: US 8,577,307 B1
(45) Date of Patent: Nov. 5, 2013

(54) WAVEFORM SCHEDULING ON A COMMON ANTENNA

(75) Inventors: Theodore J Hoffmann, Hiawatha, IA (US); Michael L Hageman, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 133 days.

(21) Appl. No.: 12/887,104

(22) Filed: Sep. 21, 2010

(51) Int. Cl.
*H04B 1/034* (2006.01)
(52) U.S. Cl.
USPC .............. 455/98; 455/63.1; 455/91; 455/431; 370/204; 370/329
(58) Field of Classification Search
USPC ........................................................ 455/98
See application file for complete search history.

(56) References Cited

U.S. PATENT DOCUMENTS

| | | | |
|---|---|---|---|
| 5,574,978 A * | 11/1996 | Talwar et al. ................. | 455/63.1 |
| 2003/0058970 A1* | 3/2003 | Hamre et al. ................. | 375/342 |
| 2007/0215745 A1* | 9/2007 | Fleury et al. ....................... | 244/2 |
| 2008/0165671 A1* | 7/2008 | Larsson ......................... | 370/204 |
| 2009/0168713 A1* | 7/2009 | Shao et al. ..................... | 370/329 |
| 2009/0170506 A1* | 7/2009 | Hirsch ........................... | 455/431 |
| 2009/0325512 A1* | 12/2009 | Granlund et al. ............... | 455/91 |
| 2011/0123028 A1* | 5/2011 | Karabinis ...................... | 380/270 |
| 2011/0304507 A1* | 12/2011 | Mujahed et al. .............. | 342/417 |

* cited by examiner

*Primary Examiner* — Ajibola Akinyemi
(74) *Attorney, Agent, or Firm* — Donna P. Suchy; Daniel M. Barbieri

(57) ABSTRACT

At least two waveforms are operated on a single antenna. A scheduler module coordinates the at least two waveforms. A modem module processes the at least two waveforms. A transmitter propagates the at least two waveforms to the antenna.

16 Claims, 4 Drawing Sheets

| Equipment | Equipment Acronym | Waveform Frequencies (in MegaHertz) | Waveform Application |
|---|---|---|---|
| Automatic Direction Finder | ADF | 0.53 - 1.7 | navigation utilizing ground based stations |
| High Frequency Communications | HF COM | 2 - 30 | voice/data communications |
| Marker Beacon | MB | 75 | runway distance utilizing ground based stations |
| Very High Frequency Communications | VHF COM | 118.00 - 136.97 | voice/data communications |
| Ultra High Frequency Communications | UHF COM | 225.00 - 400.00 | voice/data communications |
| Very High Frequency Navigation | VHF NAV | 108.0 - 117.975 | navigation utilizing ground based stations |
| VHF Omnidirectional Radio Range | VOR | 108.0 - 117.975 | navigation utilizing ground based stations |
| Instrument Landing System | ILS | 108-10 - 111.975 & 328.6 - 335.0 | precision guidance for landing approach utilizing ground based stations |

FIG. 3

| Equipment | Equipment Acronym | Waveform Frequencies (in MegaHertz) | Waveform Application |
|---|---|---|---|
| Universal Access Transceiver | UAT | 978 | traffic awareness |
| Traffic Alert Collision Avoidance System | TCAS | 1030 & 1090 | aircraft to aircraft locating |
| Transponder | XPDR | 1030 & 1090 | aircraft to aircraft location communications |
| Automatic Dependent Surveillance-Broadcast | ADS-B 1090 | 1090 | traffic awareness |
| Global Positioning System | GPS | 1575.42 & 1227.60 | satellite based locating |
| Distance Measuring Equipment | DME | 1025 - 1150 & 962 - 1213 | distance from ground based stations |
| Low-Range Radio Altimeter | LRA | 4275 - 4325 | radar altimeter |
| Weather Radar System | WXR | 9330 | weather radar |
| Terrain Awareness Warning System | TAWS | 9330 | early warning ground collision system |
| Synthetic Vision System | SVS | 9330 | synthetic terrain visualization during low visibility takeoff and landing |

FIG. 4

WAVEFORM SCHEDULING ON A COMMON ANTENNA

TECHNICAL FIELD

The present disclosure generally relates to the field of antenna platforms, and more particularly to a system and method for operating multiple waveforms on a single antenna.

BACKGROUND

In modern aviation, aircraft are required to receive and transmit electromagnetic signals. These signals include waveforms utilized for identification, navigation, communications, collision avoidance, and proximity detection. Many of the specifications of these avionics waveforms were implemented with little regard for waveform co-location. In many instances, each individual avionics waveform is implemented on a separate antenna platform. Each antenna platform potentially adds weight, increases aerodynamic drag, raises manufacturing and maintenance costs, and provides opportunities for co-site interference.

SUMMARY

A system for operation of at least two waveforms on a single antenna may include, but is not limited to a scheduler module for coordinating the at least two waveforms, a modem module operably coupled to the scheduler module for processing the at least two waveforms, and a transmitter operably coupled to the modem module for propagating the at least two waveforms to the antenna.

A method for operating at least two waveforms on a single antenna may include, but is not limited to coordinating the at least two waveforms, processing the at least two waveforms; and propagating the at least two waveforms to the antenna.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 3 is a table of common avionics waveforms and corresponding waveform characteristics; and FIG. 4 is a table of common avionics waveforms and corresponding waveform characteristics.

DETAILED DESCRIPTION

Reference will now be made in detail to the subject matter disclosed, which is illustrated in the accompanying drawings.

Figure 1:
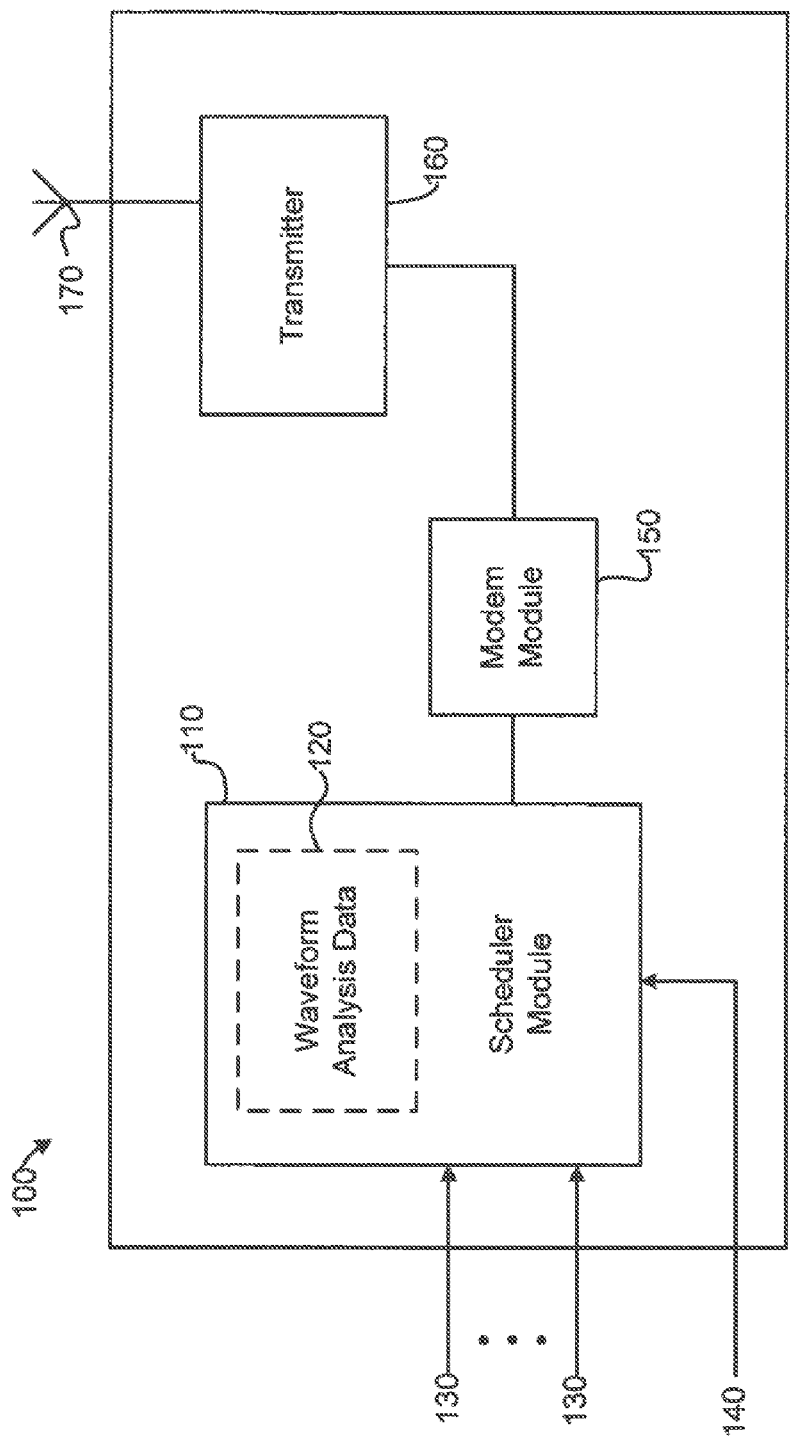
FIG. 1 is a block diagram illustrating an antenna platform.

An antenna platform (ex—antenna system) in accordance with an exemplary embodiment of the present disclosure is shown in FIG. 1. The platform 100 may include a scheduler module 110 for receiving a plurality of waveforms 130. For example, plurality of waveforms 130 may include two or more waveforms. Further, plurality of waveforms 130 may be avionics waveforms (ex—navigation waveforms, communications waveforms, collision avoidance waveforms, proximity detection waveforms). Scheduler module 110 may coordinate the two or more waveforms for platform 100. Coordinating the two or more waveforms 130 may include issuing commands to other modules (ex —150, 160) of platform 100 for the handling of the two or more waveforms 130 (ex—avionics waveforms of FIGS. 3 and 4).

Scheduler module 110 may include waveform analysis data 120 as input. For example, waveform analysis data 120 may include simulated results of waveform priority calculation for a particular set or subset of contextual variables (ex—aircraft situational information, aircraft speed, aircraft density in airspace, distance from navigational aids, distance from other aircraft, aircraft flight stage, aircraft velocity, aircraft location, airspeed, aircraft altitude, aircraft pitch angle, aircraft vertical speed, aircraft throttle position, aircraft proximity to destination, flight state (e.g., normal or emergency), ceiling, visibility, wind direction, available approaches, terrain). In further embodiments of the present disclosure, waveform analysis data 120 may include simulated results of various signal processing operations (ex—signal packetization, signal digitization). For example, waveform analysis data 120 may include waveform degradation data for plurality of waveforms 130. Waveform analysis data 120 may be calculated prior to operation of antenna system 100. Alternatively, waveform analysis data 120 may be calculated in real-time. Scheduler module 110 may coordinate plurality of waveforms 130 based on waveform analysis data 120.

Scheduler module 110 may receive contextual data 140 (ex—aircraft situational information, aircraft speed, aircraft density in airspace, distance from navigational aids, distance from other aircraft, aircraft flight stage, aircraft velocity, aircraft location, airspeed, aircraft altitude, aircraft pitch angle, aircraft vertical speed, aircraft throttle position, aircraft proximity to destination, flight state (e.g., normal or emergency), ceiling, visibility, wind direction, available approaches, terrain) for waveform coordination. For example, scheduler module 110 may coordinate plurality of waveforms 130 based on contextual data 140. Coordinating plurality of waveforms 130 may include prioritization of plurality of waveforms 130. Further, waveform coordination may be based on waveform characteristics (ex—signal frequency, waveform duration, waveform priority, waveform time-sensitivity, waveform degradation). Multipurpose waveform prioritization schemes could be derived by weighting one or more of the contextual information 140. It will also be appreciated that artificial intelligence, neural networks, and the like, might be employed such that the present invention may, over time, learn to make appropriate prioritization schemes based on the aforementioned contextual data.

Referring generally to FIGS. 3 and 4, a non-exclusive table listing avionics waveforms and corresponding waveform characteristics is provided to illustrate scheduling and prioritization. Prioritization of waveforms (ex—avionics waveforms listed in FIGS. 3 and 4) may change during scheduler module operation. For example, during a landing flight stage or a takeoff flight stage, avionics waveforms with ground navigational applications (ex—ILS, MB, SVS, TAWS) may be assigned a higher priority than avionics waveforms with airborne navigation applications or a lower utility (ex—VHF NAV, VOR, GPS, DME). During an airborne flight stage, avionics waveforms with ground navigational applications may be assigned a lower priority. In a further embodiment, during a flight stage with other aircraft in close proximity, avionics waveforms with aircraft locating applications (ex—TCAS, XPDR, GPS) may be assigned a higher priority than avionics waveforms with navigation applications (ex—VHF NAV, VOR, DME). Further, a prioritization scheme involving a flight stage may utilize relevant contextual data to identify the flight stage (ex—altitude, airspeed, proximity to destination, pitch angle, location). In addition, a prioritization scheme involving the proximity of other objects, may utilize relevant contextual information to identify the proximity of other objects (ex—altitude, proximity to destination location, aircraft density in airspace, terrain, ceiling, visibility).

In a further embodiment of the present disclosure, scheduler module 110 may coordinate two or more waveforms (ex—avionics waveforms of FIGS. 3 and 4) for simultaneous transmission if the waveforms have sufficient frequency separation. For example, as shown in FIG. 3, VOR waveforms may have a frequency of 108 Megahertz (MHz). Waveform analysis data 120 may indicate a VHF COM waveform having a frequency of 136.9 MHz is sufficiently separated from the VOR waveform frequency for simultaneous transmission. Waveform degradation data for a simultaneous transmission may be utilized for simultaneous transmission scheduling. Further, waveform duration may be utilized for scheduling. For example, a navigational waveform may possess a short duration relative to an audio communications waveform. Waveform analysis data may indicate such a navigational waveform may receive a higher priority for the extent of the short duration with an acceptable level of degradation to the audio communications waveform. In another embodiment, delaying at least one of waveforms 130 may be utilized instead of such an alternating of waveforms. Further, delaying at least one of waveforms 130 may be utilized with such an alternating of waveforms.

Platform 100 may include a modem module 150 (ex—universal modem) for processing the plurality of waveforms 130. Modem module 150 may receive waveforms from scheduler module 110. Modem module may be operably coupled to scheduler module 110. Further, modem module 150 may receive commands for processing plurality of waveforms 130 from scheduler module 110. For example, scheduler module 110 may send commands (ex—instructions) to modem module 150 to digitize a waveform for transmission. Platform 100 may include a transmitter 160 operably coupled to modem module 150. Modem module 150 may send plurality of waveforms 130 to transmitter 160 for signal propagation. Transmitter 160 may propagate plurality of waveforms 130 to antenna unit 170. Antenna platform 100 may operate plurality of waveforms 130 within specification compliance (ex—avionics standards compliance). Further, antenna platform 100 may operate plurality of waveforms 130 at least substantially simultaneously (ex—within the same time frame). Antenna platform 100 may operate plurality of waveforms 130 to have at least substantially uninterrupted utility to an operator (ex—flight crew).

Scheduler module 110 may be co-located with modem module 150 and transmitter 160 within the aircraft. In another embodiment, scheduler module may be located remotely from modem module 150 and transmitter 160, within the aircraft. Scheduler module 110 may be equipment separate from the other elements of antenna platform 100. Alternatively, scheduler module 110 may be integrated into a single unit with the other elements of antenna platform 100. Scheduler module 110 may be an integral part of an end system. Further, scheduler module 110 may reside in software.

Figure 2:
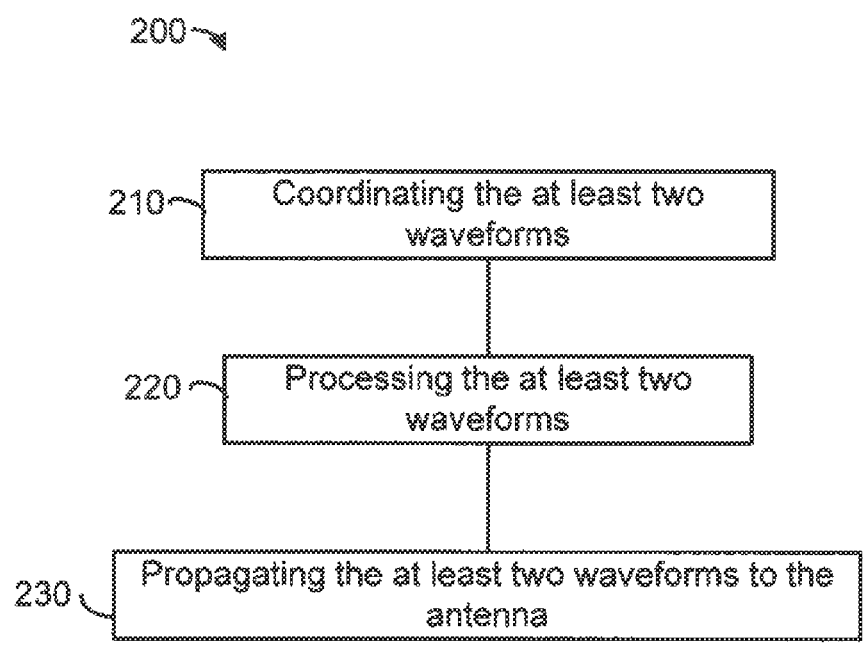
FIG. 2 is a flow diagram illustrating a method of operating an antenna platform.

Referring generally to FIG. 2, a method for operating at least two waveforms (ex—the avionics waveforms of FIGS. 3 and 4) on a single antenna is shown. The method 200 may include the step of coordinating the at least two waveforms 210. Coordinating the at least two waveforms may include utilizing contextual information. Further, coordinating the least two waveforms may be based on the contextual information. In an embodiment, coordinating the at least two waveforms may include utilizing waveform analysis data. The waveform analysis data may be calculated prior to utilization for coordinating the at least two waveforms. Further, coordinating the least two waveforms may be based on the waveform analysis data. In an exemplary embodiment of the present disclosure, the coordinating the at least two waveforms 210 may be based on one or more waveform characteristics (ex—signal frequency, waveform duration, waveform priority, waveform time-sensitivity, waveform degradation) of one or more waveforms.

The method 200 may further include the step of processing the at least two waveforms 220. For example, processing the at least two waveforms (ex—the avionics waveforms of FIGS. 3 and 4) may include digitizing at least one analog waveform of the at least two waveforms. Further, the method 200 may further include the step of propagating the at least two waveforms (ex—the avionics waveforms of FIGS. 3 and 4) to the antenna. In exemplary embodiments of the present disclosure, the method 200 may operate within specification compliance (ex—avionics standards compliance). Further, the method 200 may operate the at least two waveforms at least substantially simultaneously (ex—within the same time frame). Method 200 may operate at least two waveforms to have at least substantially uninterrupted utility. Platform 100 may perform method 200.

In the present disclosure, the methods disclosed may be implemented as sets of instructions or software or firmware readable by a device. Such software may include a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system for operation of at least two waveforms on a single antenna, comprising:
 a scheduler module for coordinating the at least two waveforms, the scheduler module configured for receiving contextual information including one or more contextual variables and coordinating the at least two waveforms based at least partially on the contextual information and at least partially on waveform analysis data including at least one simulated result of waveform priority calculation for at least one set or subset of the one or more contextual variables, wherein the coordinating includes issuing commands for handling of the at least two waveforms to at least one module;

a modem module operably coupled to the scheduler module for processing the at least two waveforms; and a transmitter operably coupled to the modem module for propagating the at least two waveforms to the antenna, wherein the at least two waveforms at least substantially continuously operate within avionics specification compliance and at least substantially simultaneously operate within avionics specification compliance.

2. The system of claim 1, wherein the waveform analysis data is calculated prior to utilization by the scheduler module.

3. The system of claim 1, wherein the contextual information received by the scheduler module includes at least one of:

aircraft situational information, aircraft speed, aircraft density in airspace, distance from navigational aids, distance from other aircraft, aircraft flight stage, aircraft velocity, aircraft location, airspeed, aircraft altitude, aircraft pitch angle, aircraft vertical speed, aircraft throttle position, aircraft proximity to destination, flight state, ceiling, visibility, wind direction, available approaches, or terrain.

4. The system of claim 1, wherein the coordinating the at least two waveforms includes:

coordinating the at least two waveforms based at least partially on at least one frequency of at least one waveform of the at least two waveforms.

5. The system of claim 1, wherein the coordinating the at least two waveforms includes:

coordinating the at least two waveforms based at least partially on at least one timing requirement of at least one waveform of the at least two waveforms.

6. The system of claim 1, wherein the coordinating the at least two waveforms includes:

coordinating the at least two waveforms based at least partially on at least one priority of at least one waveform of the at least two waveforms.

7. The system of claim 1, wherein the coordinating the at least two waveforms includes:

coordinating the at least two waveforms based at least partially on at least one acceptable level of degradation of at least one waveform of the at least two waveforms.

8. The system of claim 1, wherein the processing the at least two waveforms includes:

digitizing at least one analog waveform of the at least two waveforms.

9. A method for operating at least two waveforms on a single antenna, comprising:

receiving contextual information including one or more contextual variables;

coordinating the at least two waveforms based at least partially on the contextual information and at least partially on waveform analysis data including at least one simulated result of waveform priority calculation for at least one set or subset of the one or more contextual variables, the one or more contextual variables including at least one of:

aircraft situational information, aircraft speed, aircraft density in airspace, distance from navigational aids, distance from other aircraft, aircraft flight stage, aircraft velocity, aircraft location, airspeed, aircraft altitude, aircraft pitch angle, aircraft vertical speed, aircraft throttle position, aircraft proximity to destination, flight state, ceiling, visibility, wind direction, available approaches, or terrain;

processing the at least two waveforms; and propagating the at least two waveforms to the antenna, wherein the at least two waveforms at least substantially continuously operate within avionics specification compliance and at least substantially simultaneously operate within avionics specification compliance.

10. The method of claim 9, wherein the waveform analysis data is calculated prior to utilization for coordinating the at least two waveforms.

11. The method of claim 9, wherein the coordinating the at least two waveforms includes:

coordinating the at least two waveforms based at least partially on at least one frequency of at least one waveform of the at least two waveforms.

12. The method of claim 9, wherein the coordinating the at least two waveforms includes:

coordinating the at least two waveforms based at least partially on at least one timing requirement of at least one waveform of the at least two waveforms.

13. The method of claim 9, wherein the coordinating the at least two waveforms includes:

coordinating the at least two waveforms based at least partially on at least one priority of at least one waveform of the at least two waveforms.

14. The method of claim 9, wherein the coordinating the at least two waveforms includes:

coordinating the at least two waveforms based at least partially on at least one acceptable level of degradation of at least one waveform of the at least two waveforms.

15. The method of claim 9, wherein the processing the at least two waveforms includes:

digitizing at least one analog waveform of the at least two waveforms.

16. The method of claim 9, wherein the coordinating the at least two waveforms includes:

issuing commands for handling of the at least two waveforms.

* * * * *